(12) United States Patent
Kashiwazaki et al.

(10) Patent No.: US 11,303,219 B2
(45) Date of Patent: Apr. 12, 2022

(54) POWER CONVERSION APPARATUS WITH ANNULARLY-ARRANGED SWITCHING AND CAPACITOR MODULES

(71) Applicant: DENSO CORPORATION, Kariya (JP)

(72) Inventors: Takashi Kashiwazaki, Nisshin (JP); Tomohisa Sano, Kariya (JP)

(73) Assignee: DENSO CORPORATION, Kariya (JP)

( * ) Notice: Subject to any disclaimer, the term of this patent is extended or adjusted under 35 U.S.C. 154(b) by 34 days.

(21) Appl. No.: 16/897,534

(22) Filed: Jun. 10, 2020

(65) Prior Publication Data

US 2020/0395868 A1  Dec. 17, 2020

(30) Foreign Application Priority Data

Jun. 13, 2019 (JP) .............................. JP2019-110346

(51) Int. Cl.
*H02M 7/48* (2007.01)
*H02M 7/64* (2006.01)
*H02K 11/33* (2016.01)
*H02M 7/483* (2007.01)

(52) U.S. Cl.
CPC .............. *H02M 7/48* (2013.01); *H02K 11/33* (2016.01); *H02M 7/64* (2013.01); *H02M 7/4835* (2021.05)

(58) Field of Classification Search
CPC ....................................................... H02M 7/48
USPC ........................................... 361/97, 131–133
See application file for complete search history.

(56) References Cited

U.S. PATENT DOCUMENTS

| 5,576,943 | A | * | 11/1996 | Keir | ....................... | H02M 7/538 |
| | | | | | | 363/56.05 |
| 6,028,779 | A | * | 2/2000 | Sakamoto | ............. | H02M 7/003 |
| | | | | | | 363/55 |
| 6,449,181 | B1 | * | 9/2002 | Rieger | .................. | H02M 7/493 |
| | | | | | | 363/159 |
| 6,501,653 | B1 | | 12/2002 | Landsgesell et al. | | |
| 6,804,127 | B2 | * | 10/2004 | Zhou | ...................... | H02M 5/458 |
| | | | | | | 363/37 |
| 9,142,963 | B2 | * | 9/2015 | Hasler | .................... | H02J 3/1857 |
| 9,701,208 | B2 | * | 7/2017 | Berger | ................ | H02M 7/5387 |
| 9,881,912 | B2 | * | 1/2018 | Takao | ................ | H01L 29/7805 |
| 10,454,331 | B2 | * | 10/2019 | Gotz | ........................ | H02K 3/28 |

(Continued)

FOREIGN PATENT DOCUMENTS

JP          2004-048823 A       2/2004
JP          2007116840 A  *     5/2007
(Continued)

*Primary Examiner* — Kevin J Comber
*Assistant Examiner* — Nusrat Quddus
(74) *Attorney, Agent, or Firm* — Oliff PLC

(57) ABSTRACT

A power conversion apparatus is provided in a rotary electric machine, converting a power between a DC power source and the rotary electric machine having a multiphase winding. The power conversion apparatus includes: a plurality of switching modules each having a switching element for performing switching to control a current direction of a current flowing from the DC power source to the winding; a plurality of capacitor modules each having a capacitor that suppresses high frequency oscillation occurring on the current due to the switching operation; a positive side conductor connected to a positive electrode of the DC power source; and a negative side conductor connected to a negative electrode of the DC power source.

6 Claims, 7 Drawing Sheets

(56) References Cited

U.S. PATENT DOCUMENTS

| | | |
|---|---|---|
| 2009/0285004 A1* | 11/2009 | Welchko .............. H02M 7/003 363/131 |
| 2014/0084993 A1* | 3/2014 | Takao .................. H02M 7/003 327/534 |
| 2015/0043261 A1 | 2/2015 | Koshi |
| 2015/0061567 A1* | 3/2015 | Gorka .................... H02P 25/22 318/724 |
| 2015/0097470 A1 | 4/2015 | Sasaki et al. |
| 2016/0276895 A1 | 9/2016 | Aizawa et al. |
| 2018/0177080 A1 | 6/2018 | Kitao et al. |
| 2019/0229584 A1 | 7/2019 | Shinozaki et al. |

FOREIGN PATENT DOCUMENTS

| | | | |
|---|---|---|---|
| JP | 2007-215299 A | | 8/2007 |
| JP | 2011030321 A | * | 7/2009 |
| JP | 2013-198367 A | | 9/2013 |
| JP | 2016-019346 A | | 2/2016 |
| JP | 2016-181675 A | | 10/2016 |
| WO | 2013/118703 A1 | | 8/2013 |

\* cited by examiner

POWER CONVERSION APPARATUS WITH ANNULARLY-ARRANGED SWITCHING AND CAPACITOR MODULES

CROSS-REFERENCE TO RELATED APPLICATION

This application is based on and claims the benefit of priority from earlier Japanese Patent Application No. 2019-110346 filed Jun. 13, 2019, the description of which is incorporated herein by reference.

BACKGROUND

Technical Field

The present disclosure relates to a power conversion apparatus provided in a rotary electric machine for converting power between a DC power source and the rotary electric machine.

Description of the Related Art

As an example of power conversion apparatus, a power conversion apparatus provided with positive and negative side conductors having annular shape is known.

SUMMARY

The present disclosure provides a power conversion apparatus provided in a rotary electric machine, converting a power between a DC power source and the rotary electric machine having a multiphase winding. The power conversion apparatus includes: a plurality of switching modules each having switching elements for performing switching to control a current direction of a current flowing from the DC power source to the winding; a plurality of capacitor modules each having a capacitor that suppresses high frequency oscillation occurring on the current due to the switching operation; a positive side conductor connected to a positive electrode of the DC power source; and a negative side conductor connected to a negative electrode of the DC power source.

DESCRIPTION OF THE PREFERRED EMBODIMENTS

As a conventional power conversion apparatus, for example, Japanese Patent Application Laid-Open Publication Number 2016-19346 discloses a power conversion apparatus in which annularly arranged switching modules and capacitor modules are connected in parallel between the positive side conductor and the negative side conductor. In these modules, at least two capacitor modules located to be adjacent in the circumferential direction form a capacitor group. The capacitor modules are arranged densely in the capacitor group, and the capacitor modules are arranged roughly between the capacitor groups. Thus, space is secured between the capacitor groups in order to arrange other components.

However, when the capacitor modules are arranged densely in the capacitor group, capacitor modules may be arranged adjacent to one side of the switching modules, but other capacitor modules may not be arranged adjacent to the other side of the switching modules in the circumferential direction of the annularly arranged switching modules and the capacitor modules. In this case, when the current flows from the switching modules to the capacitors included in the one side capacitor module located most closely to the switching modules current concentration occurs in the capacitors included in the one side capacitor module, thus causing a deviation in the current flowing through the capacitors. As a result, a deviation occurs in amount of heat generated between capacitor modules and thermal characteristics may be degraded.

In order to suppress a deviation of an amount of heat generated in the capacity modules, the capacitor modules may be arranged in both sides of the switching modules. However, in the case where the capacitances vary in the capacitors included in the capacitor modules arranged in the both sides, the amount of heat generated in the capacitor modules including capacitors having small amount of capacitances increases, even when the same amount of current flows from the switching modules to the both sides of the capacitor modules, the amount of heat in the capacitor modules including the capacitors having small capacitances increases so that the heat characteristics are degraded. According to the above-described conventional power conversion apparatus, the capacitances of the capacitors are not considered.

First Embodiment

Figure 1:
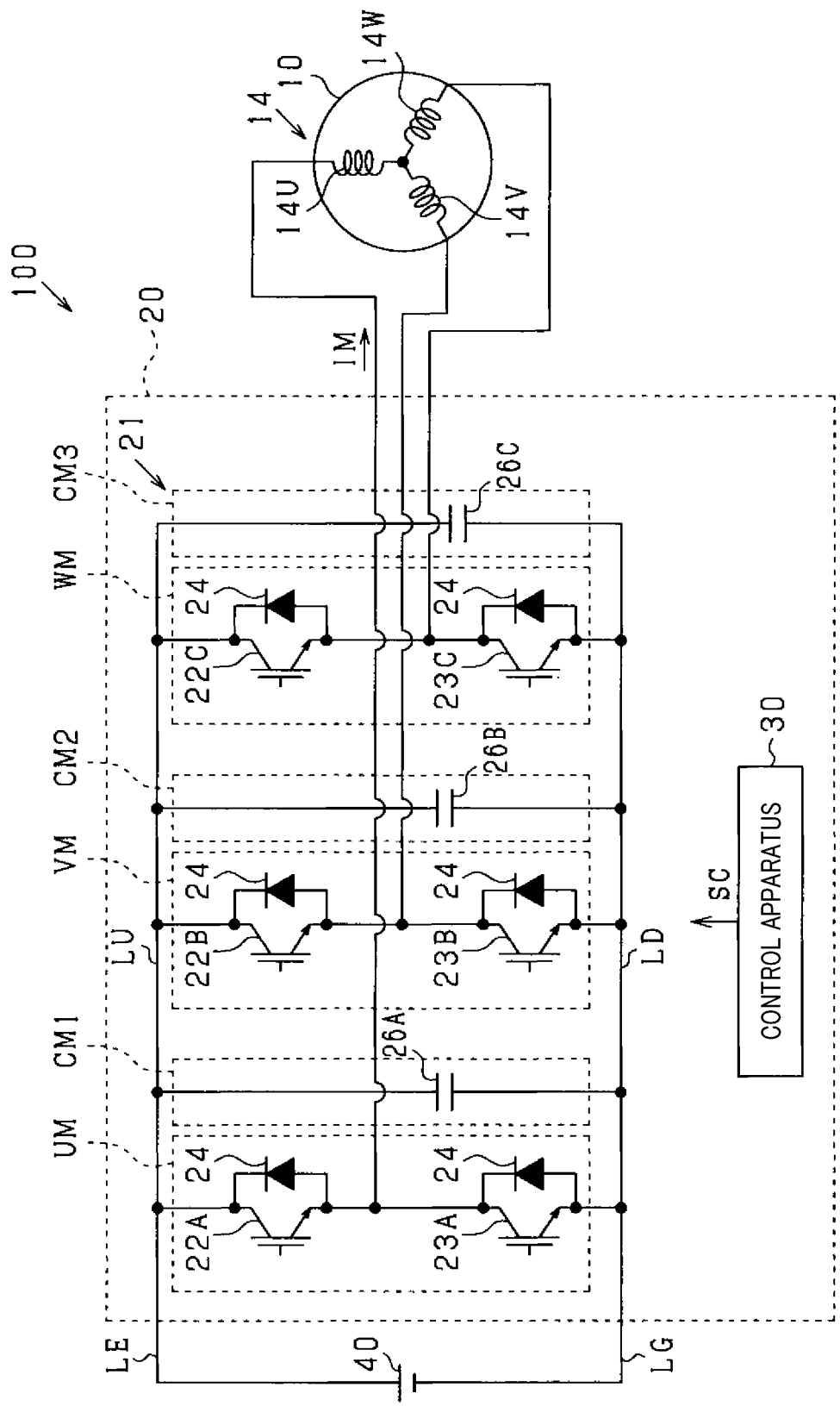
FIG. 1 is a block diagram showing an overall configuration of a rotary electric machine system according to the present disclosure.

Hereinafter, with reference to the drawings, a power conversion apparatus applied to an on-vehicle rotary electric machine 100 according to a first embodiment of the present disclosure will be described As shown in FIG. 1, a power conversion apparatus 20 includes a control apparatus 30 for controlling an inverter 21 and a rotary electric machine 10 as control objects, and configured to covert the power between a battery 40 and the rotary electric machine 10.

The rotary electric machine 10 includes a regenerative power generation function and a power running function. The rotary electric machine 10 is configured as a motor generator (i.e. MG). The rotary electric machine 10 transmits power from/to the battery 40 to apply a driving force to a vehicle with a power supplied from the battery 40 when in the power running operation of the vehicle, and to generate power using deceleration energy of the vehicle in the regenerative power generation operation of the vehicle, thereby transmitting the power to the battery 40.

The rotary electric machine 10 includes a three-phase winding 14 which is star-connected. The three-phase winding 14 includes U, V, W phase windings 14U, 14V, 14W. The winding 14 of respective phases of the rotary electric machine is connected to the battery 40 as a DC power source through the inverter 21. The battery 40 is a storage battery capable of being charged and discharged. Specifically, the battery 40 is configured as a battery pack in which a plurality of lithium ion batteries are connected in series. Note that the battery 40 may be configured as other type of battery. According to the present embodiment, the battery 40 corresponds to DC power source.

The inverter 21 is provided with a plurality of switching modules UM, VM, WM each having a series-connected circuit composed of an upper arm switch 22 (22A, 22B, 22C) as a high potential side switching element and a lower arm switch (23A, 23B, 23C) as a high potential side switching element. At a connection point between each upper arm switch 22 and each lower arm switch 23, a first end of the winding 14 corresponding phase of the rotary electric machine 10. According to the present embodiment, as the switches 22 and 23, a voltage control type semiconductor module, specifically, IGBT (i.e. insulated gate bipolar transistor) is used. For respective switches, free wheel diodes 24 are connected in reverse-parallel.

The inverter 21 is provided with capacitor modules CM1 to CM3 each having a capacitor 26 (26A, 26B, 26C). According to the present embodiment, the inverter 21 includes three capacitor modules CM1 to CM3 of which the number of capacitor modules is the same as the number of switching modules UM, VM, WM. The capacitance of the capacitor 26 included in each of the capacitor modules CM1 to CM3 is set to be the same value. According to the present embodiment, an electrolytic capacitor is used as the capacitor 26.

The plurality of switching modules UM, VM, WM and the plurality of capacitor modules CM1 to CM3 are connected in parallel between a positive side conductor LU and a negative side conductor LD. The positive side conductor LU is connected to the positive terminal of the battery 40 via the power line LE. The negative side conductor LD is connected to the negative terminal of the battery 40 via the ground line LG.

The control apparatus 30 acquires a command value and controls the inverter 21 such that the control quantity of the rotary electric machine 10 to be the command value. The control quantity is a torque, for example. Specifically, for controlling the inverter 21, the control apparatus 30 outputs a drive signal SC to corresponding switch 22, 23 such that each switch 22, 23 is alternately turned ON with a dead time between ON periods of the switches 22 and 23.

The respective switching modules UM, VM, WM controls a current direction of the current flowing from the battery to the winding 14 by the switching of the switches 22 and 23 based on the drive signal SC. In respective capacitor modules CM1 to CM3, the capacitor 26 suppresses high frequency oscillation occurring on the current IM due to the switching operation.

Next, a configuration of the rotary electric machine 10 will be described in detail. The rotary electric machine 10 is configured as an outer-rotor type surface magnet rotary electric machine, and is used as an in-wheel motor in the wheels.

Figure 2:
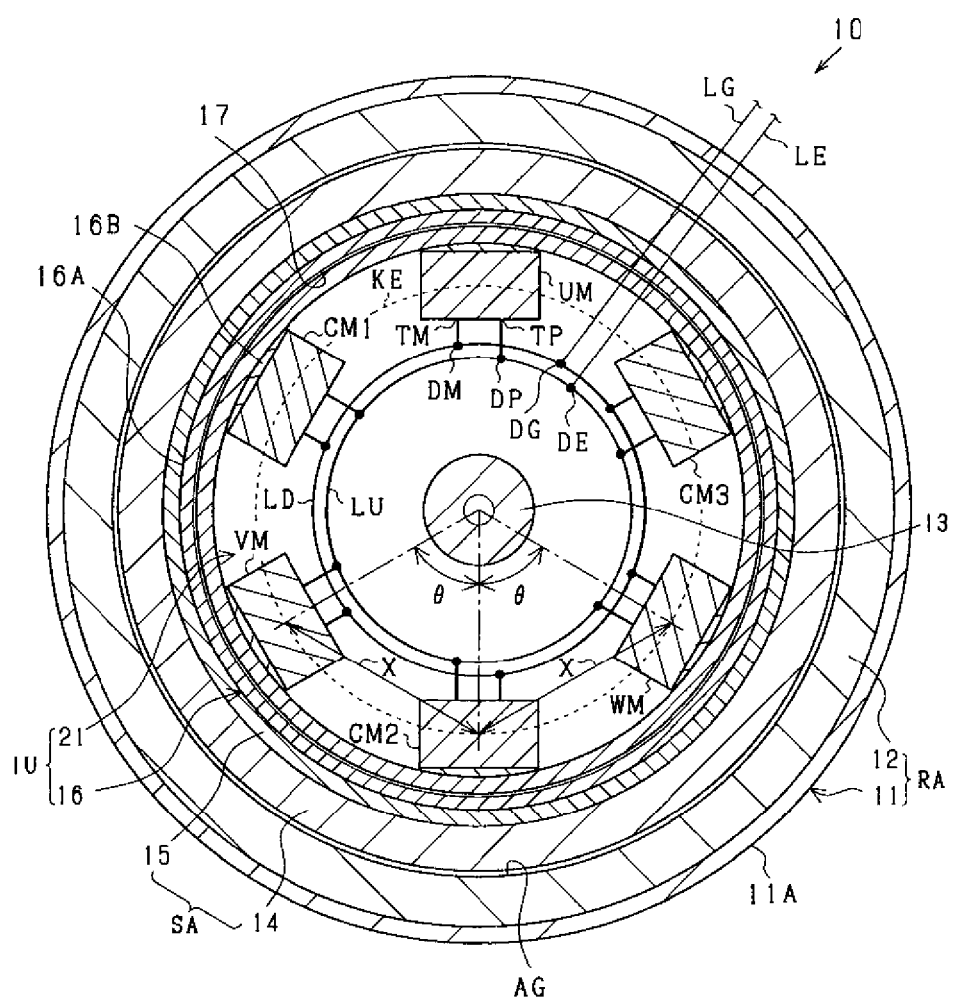
FIG. 2 is a diagram showing a lateral cross-sectional view of a rotary electric machine.

FIG. 2 is a lateral cross-sectional view of the rotary electric machine 10. The rotary electric machine 10 is provided with a rotor RA, a stator SA and an inverter unit IU. The rotor RA, the stator SA and the inverter unit IU are arranged co-axially relative to a rotary shaft 13 integrated with the rotor RA, and assembled in the axial direction, thereby constituting the rotary electric machine 10.

In the rotary electric machine 10, the rotor R and the stator SA are each formed in a cylindrical shape, and arranged facing each other with a predetermined air gap AG therebetween. The rotor RA rotates together with the rotary shaft 13, whereby the rotor RA rotates in the outer side of the stator SA with respect to the radial direction.

The rotor RA is provided with a rotor carrier 11 having substantially cylindrical shape and a magnet unit 12 having annular shape fixed to the rotor carrier 11. The rotor carrier 11 is fixed to the rotary shaft 13.

The rotor carrier 11 includes a cylindrical portion 11A. The magnet unit 12 is fixed to a portion of a radially inner side of the cylindrical portion 11A. In other words, the magnet unit 12 is provided to be surrounded by the cylindrical portion 11A of the rotor carrier 11 from radially outside. Note that the rotor carrier 11 is made of, for example, steel plate cold commercial (SPCC), forging steel, and carbon fiber reinforced plastic (CFRP).

The magnet unit 12 is configured of a plurality of permanent magnets arranged such that the polarity is alternately changed in the circumferential direction of the rotor RA. Thus, the magnet unit 12 has a plurality of magnetic poles in the circumferential direction. The permanent magnet is fixed to the rotor carrier 11 by a bonding, for example. According to the present embodiment, as a permanent magnet, a sintered neodymium magnet is utilized.

The stator SA is provided with the above-described winding 14 and the stator core 15. The winding 14 is formed as a winding in a substantially cylindrical shape (annular shape). A stator core 15 as a base member is attached to a portion in a radially inside of the winding 14.

The stator core 15 is configured such that a plurality of electrical steel are laminated in the axial direction and being formed in a cylindrical shape having a predetermined thickness in the radial direction. The winding 14 is assembled with the stator core 15 at a portion in the radially outside as a rotor RA side. The outer peripheral surface of the stator core 15 has a curved shape without unevenness. In a state where the winding 14 is assembled with the stator core 15, lead wires constituting the winding core 14 are arranged on the outer peripheral surface of the stator core 15 in the circumferential direction.

The inverter unit IU is provided with an inverter housing 16 and the above-described inverter 21. The inverter housing 16 includes a cylindrical portion 16A having a cylindrical shape. The stator core 15 is fixed to a portion in radially outside the cylindrical portion 16A. Thus, the stator SA and the inverter unit IU are integrated.

A plurality of spacers 16B each having a planar surface are fixed to the inner peripheral surface of the cylindrical portion 16A, for mounting respective modules of the inverter 21. The respective modules are attached to corresponding spacer 16B. Thus, the respective modules are arranged on the cylindrical portion 16A of the inverter housing 16 in the circumferential direction.

A coolant passage 17 is formed in a portion radially outside the spacer 16B in the cylindrical portion 16A for circulating the cooling water. The cooling water circulating the coolant passage 17 cools the respective modules. Note that cooling oil instead of the cooling water can be used as a refrigerant. The coolant passage 17 is provided annularly along the cylindrical portion 16A, in which the cooling water circulating the coolant passage 17 flows to a down stream side from an upstream side via each of the modules one by one.

The inverter 21 is attached to the inverter housing 16. Each module of the inverter 21 is disposed annularly along the cylindrical portion 16A to be arranged on a virtual circle KE. These modules are arranged such that the interval X between modules in the circumferential direction on the virtual circle KE are the same interval. For example, the interval X is defined as a distance between center positions of two modules located adjacently in the circumferential direction.

Note that the interval between modules in the circumferential direction may be defined as an angle interval $\theta$ with respect to the rotary shaft 13 in the virtual circle KE as the center thereof.

According to the present embodiment, the respective modules are arranged in the circumferential direction in the order of an U-phase switching module UM, a first capacitor module CM1, a V-phase switching module VM, a second capacitor module CM2, a W-phase switching module WM and a third capacitor module CM3. In other words, in the inverter 21, the switching module #M (#=U, Y, W) and the capacitor module CM are alternately arranged in the circumferential direction, and the switching module #M are distributed to be apart from each other.

The positive side conductor LU is formed in annular shape, and arranged coaxially with respect to the rotary shaft 13. The positive side conductor LU provides electrical connection with a positive terminal TP of each module in the above-described order in the circumferential direction. According to the present embodiment, positive terminals TP of the respective modules are connected to the positive side conductor LU at mutually different positions DP which are arranged to have the same interval in the circumferential direction. Moreover, the positive side conductor LU is connected to the power line LE at the connection point DE.

The negative side conductor LD is formed in annular shape, and arranged coaxially with respect to the positive side conductor LU. The negative side conductor LD provides electrical connection with a negative terminal TM of each module in the above-described order in the circumferential direction. According to the present embodiment, negative terminals TM of the respective modules are connected to the negative side conductor LD at mutually different positions DM which are arranged to have the same interval in the circumferential direction. Moreover, the negative side conductor LD is connected to the ground line LG at the connection point DG.

Note that the control apparatus 30 may be integrated in the rotary electric machine 10 or may be provided outside the rotary electric machine 10.

According to the present embodiment, the switching module #M and the capacitor module CM are arranged alternately in the circumferential direction, whereby the capacitor module CM is disposed at each of both sides of the switching module #M. The capacitance of the capacitor 26 included in each of the capacitor modules CM1 to CM3 is set to be the same value. In this case, when the switches 22 and 23 included in the respective switching modules #M are operating, substantially the same amount of current IM flow into the adjacent capacitors 26 having the same capacitance located at the both sides of the switching module #M. Thus, heat generated by the respective capacitor modules CM1 to CM3 can be equalized, thereby suppressing a deviation of the amount of heated generated in the capacitor modules CMs.

Figure 3:
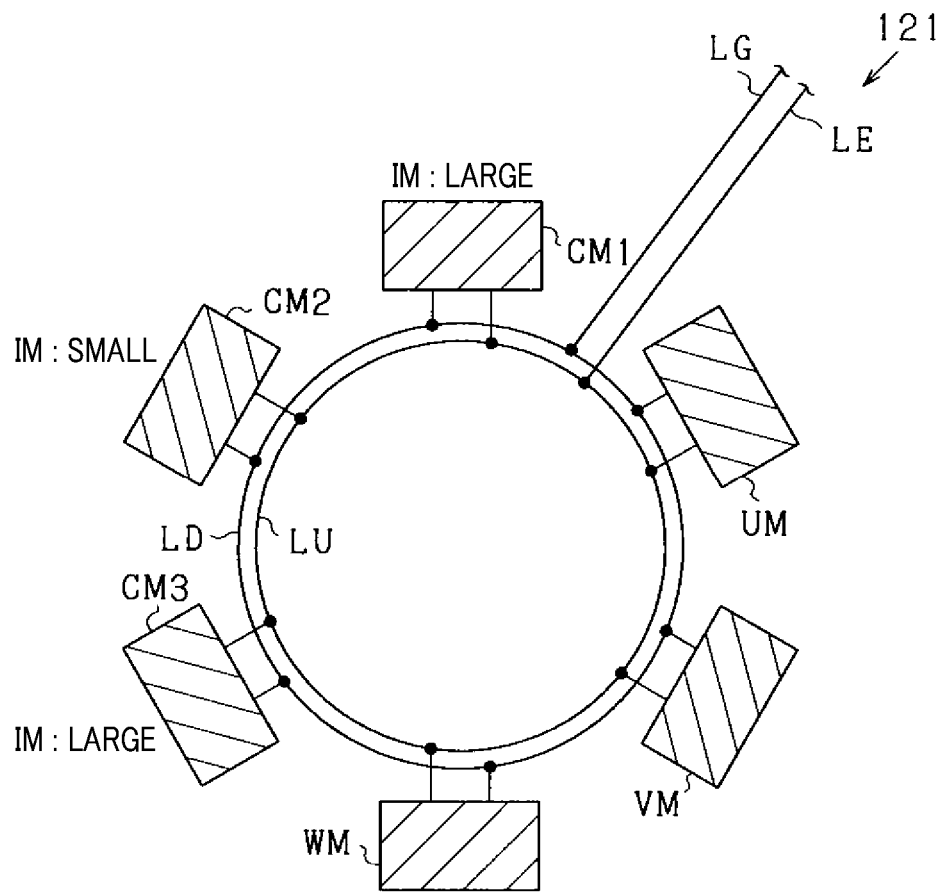
FIG. 3 is a diagram showing an overall configuration of an inverter according to a comparative example.

FIG. 3 illustrates an inverter 121 of a comparative example. For the inverter 121, a U-phase switching module UM, a V-phase switching modules VM, a W-phase switching module WM, a first capacitor module CM1, and a second capacitor module CM2 and a third capacitor module CM3 are arranged in this order. In other words, in the inverter 121, the switching module #M and the capacitor module CM are each arranged concentratedly in the circumferential direction.

In this case, total impedance from the respective switching modules #M to each capacitor 26 included in the respective capacitor modules CM1 to CM3 are different from each other. Hence, when the switches 22 and 23 included in the respective switching modules #M are operating, the current IM flows concentratedly to a capacitor 26 having the shortest conduction path on the conductors LU and LD from the respective switching modules #M, that is, the current IM flows concentratedly to a capacitor 26 having the smallest inductance on the conductor LU and LD. As a result, the current IM flowing to the capacitor 26 included in the first and third capacitor modules CM1 and CM3 positioned at both side in the circumferential direction becomes large. On the other hand, the current IM flowing to the capacitor 26 included in the capacitor module CM2 positioned in the center of the circumferential direction becomes small.

Figure 4:
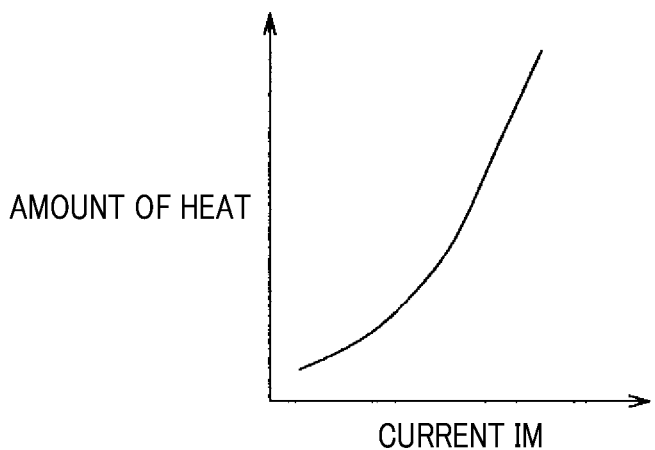
FIG. 4 is a graph showing a relationship between current flowing through a capacitor and an amount of heat generated by a capacitor module.

Thus, according to the inverter 121 of the comparative example, a deviation is present in the current IM flowing to the capacitors 26 included in the respective capacitor modules CM1 to CM3. FIG. 4 illustrates a relationship between current IM and an amount of heat generated by the capacitor module CM. As shown in FIG. 4, an amount of heat changes depending on a change in an amount of current IM. Hence, in the case where a deviation is present in the current IM, a deviation occurs in the amount of heat of the capacitor module CM. As a result, thermal characteristics of the capacitor module CM are degraded.

Figure 5A:
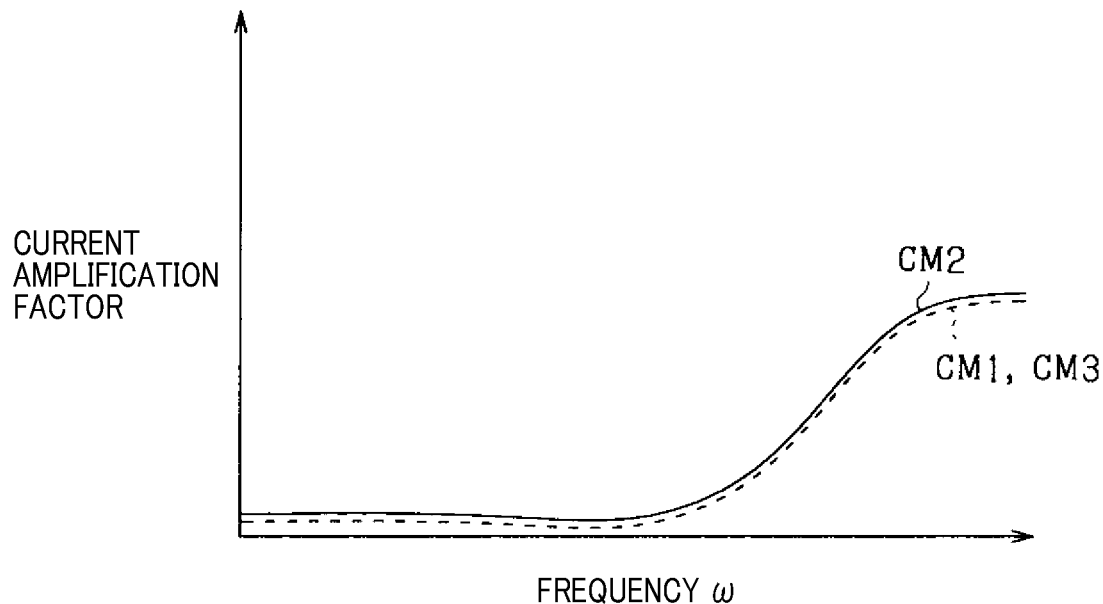
FIGS. 5A and 5B are graphs each showing frequency characteristics of current amplification factor of the capacitor module.
Figure 5B:
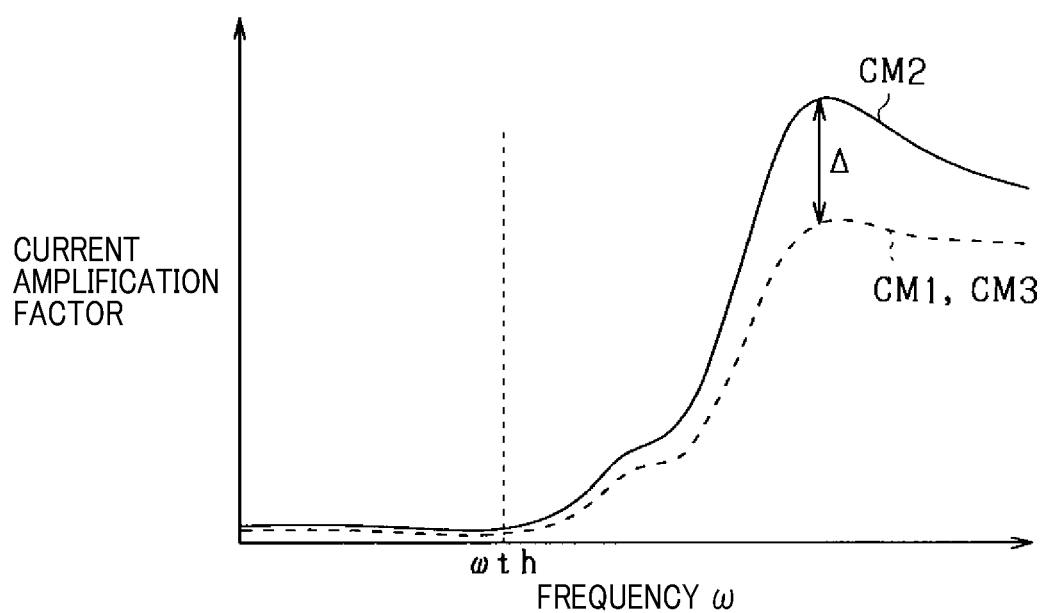

FIGS. 5A and 5B each show frequency characteristics of the current amplification factor of the capacity module CM. FIG. 5A shows frequency characteristics of the inverter 21 according to the present embodiment, and FIG. 5B shows frequency characteristics of the inverter 121 of the comparative example. Note that the current amplification factors of the first and third capacitor modules CM1 and CM3 are shown with dotted lines and the current amplification factor of the second capacitor module CM2 is shown with a slid line in FIGS. 5A and 5B.

As shown in FIG. 5B, according to the inverter 121 of the comparative example, since a deviation occurs in an amount of generated heat of the capacitor modules CM1 to CM3, difference $\Delta$ is present between the current amplification factor of the first and third capacitor modules CM1 and CM3, and the current amplification factor of the second capacitor module CM2 in the frequency $\omega$ larger than a predetermined frequency $\omega$ th. As a result, the current IM flowing through the windings 14 of the respective phases in the rotary electric machine 10 varies. Accordingly, the current IM flowing through the windings 14 cannot be appropriately controlled.

As shown in FIG. 5A, according to the inverter 1 of the present embodiment, since a deviation of the generated heat of the capacitor modules CM1 to CM3 is suppressed, current amplification factors of the respective capacitor modules CM1 to Cm3 are the same. As a result, a variation of the current IM flowing through the windings 14 of the respective phases in the rotary electric machine 10 is suppressed, and the current IM flowing through the windings 14 can be controlled appropriately.

According to the above-described embodiment, the following effects and advantages can be obtained.

According to the present embodiment, the inverter 21 is provided with a plurality of switching modules UM, VM and WM and a plurality of capacitor modules CM1 to CM3, and these modules are connected in parallel between the positive side conductor LU and the negative side conductor LD. Since these switching modules UM, VM and WM, and the capacitor modules CM1 to CM3 are annularly arranged, and the positive side conductor LU and the negative side conductor LD are arranged correspondingly, an amount of generated heat of the capacitor module CM may vary depending on the arrangement order of the respective modules in the circumferential direction.

In this respect, according to the present embodiment, the capacitor modules CM are arranged at both sides of the respective switching modules #M, and the capacitances of the capacitors 26 included in the capacitor modules CM1 to CM3 are set to be the same value. According to this configuration, since substantially the same amounts of current IM flow to the capacitors 26 having the same capacitance positioned at both sides, an amount of heat generated in the respective capacitor modules can be equalized. Therefore, deviation in the generated heat in the capacitor modules CM1 to CM3 can be suppressed.

In particular, according to the present embodiment, in the rotary electric machine 10, the rotor RA and the stator SA are arranged facing each other in the radial direction, and the cylindrical portion 16A of the inverter housing 16 is fixed to a portion of a radially inner side of the stator SA. The respective modules in the inverter 21 are arranged on the cylindrical portion 16A in the circumferential direction.

According to this configuration, the respective modules are arranged in radially inner side with respect to the rotor RA and the stator SA in the rotary electric machine 10, whereby the power conversion apparatus 20 can be disposed efficiently in the rotary electric machine 10. On the other hand, in a configuration in which the stator SA and the inverter housing 16 are integrated and the inverter 21 is attached to the inverter housing 16, the power converter apparatus 20 may be influenced by heat of the stator SA. According to the present embodiment, since the arrangement of the respective capacitor modules CM1 to CM3 is optimized as described above, suitable heat countermeasure can be accomplished.

According to the present embodiment, the plurality of switching modules UM, VM and WM and the plurality of capacitor modules CM1 to CM3 are arranged such that each switching module #M and capacitor module CM are alternately arranged in the circumferential direction. According to this configuration, the number of capacitor modules CMs required for the power conversion apparatus 20 can be reduced while the current IM flowing to each capacitor 26 included in the respective capacitor modules CM1 to CM3 is equalized. Hence, the configuration of the power conversion apparatus 20 can be simplified.

According to the present embodiment, the connection points DP and DM connected to the respective terminals TP and TM in the switching module M # and the capacitor module CM are arranged at equal intervals on the positive side conductor LU and the negative side conductor LD. According to this configuration, total impedance from the respective switching modules #M to each capacitor 26 included in each capacitor module CM located at both sides of respective switching modules #M can be the same. Thus, a deviation in the heat generation of the capacitor modules CMs can be suppressed.

Second Embodiment

Figure 6:
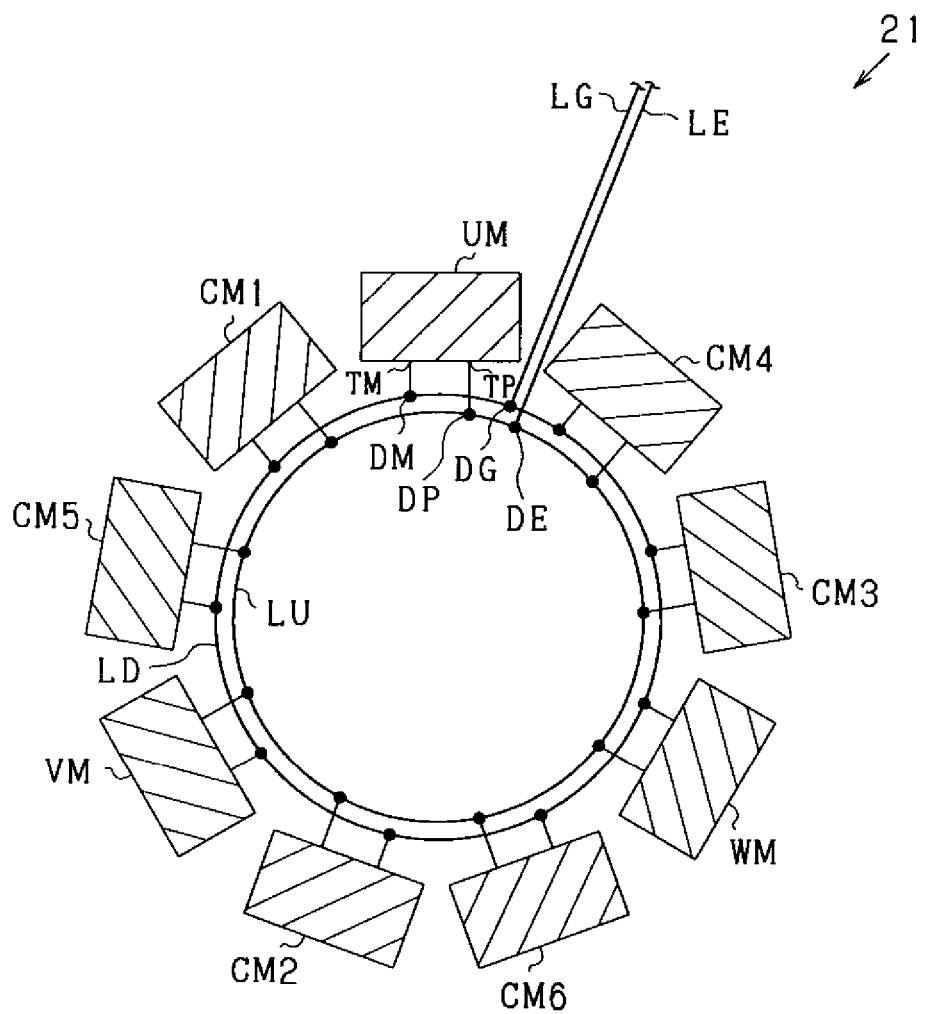
FIG. 6 is a diagram showing an overall configuration of an inverter according to a second embodiment.

Hereinafter, with reference to FIG. 6, a second embodiment will be described. In the second embodiment, configurations different from those in the first embodiment will be mainly described. In FIG. 6, configurations same as those in FIG. 2 will be applied with the same reference numbers as those in FIG. 2 and the explanation thereof will be omitted for the sake of convenience.

According to the second embodiment, the inverter 21 is provided with six capacitor modules CM1 to CM6 of which the number of modules is two times of the number of the switching modules UM, VM and WM, which is different from the first embodiment. As shown in FIG. 6, the respective modules are arranged in the circumferential direction in the order of a U-phase switching module UM, a first capacitor module CM1, a fifth capacitor module CM5, a V-phase switching module, a second capacitor module CM2, a sixth capacitor module CM6, a W-phase switching modules WM, a third capacitor module CM3 and a fourth capacitor module CM4. In other words, the inverter 21 includes two capacitor modules CMs are each arranged between the switching modules #M positioned adjacently in the circumferential direction.

The two capacitor modules CMs arranged between the switching modules #M positioned adjacently are connected to the positive side conductor LU and the negative side conductor LD at the connection points DP, DM of which the positions are different between the two capacitor modules CMs. For the positive and negative side conductors LU and LD, the connection points DP and DM are arranged at equal intervals in the circumferential direction. Hence, according to the present embodiment, the inductance in a path from the respective switching modules #M to the capacitors 26 at both sides thereof is smaller than that of the first embodiment.

According to the above-described embodiment, since the two capacitor modules CMs are adjacently positioned in the circumferential direction, no switching modules #M are arranged at both sides of respective capacitor modules CMs. Hence, it is avoided that the current IM flows to the capacitor 26 included in the respective capacitor modules CMs from the switching modules #M at the both sides, whereby an excessive amount of current IM is prevented from flowing into the capacitor 26.

According to the present embodiment, the current IM flowing to each capacitor 26 included in the respective capacitor modules CM is suppressed and the inductance in a path from the respective switching modules #M to the capacitors 26 at both sides thereof is reduced. Hence, an amount of heat generated in the respective capacitor modules CM can preferably be suppressed.

Third Embodiment

Figure 7:
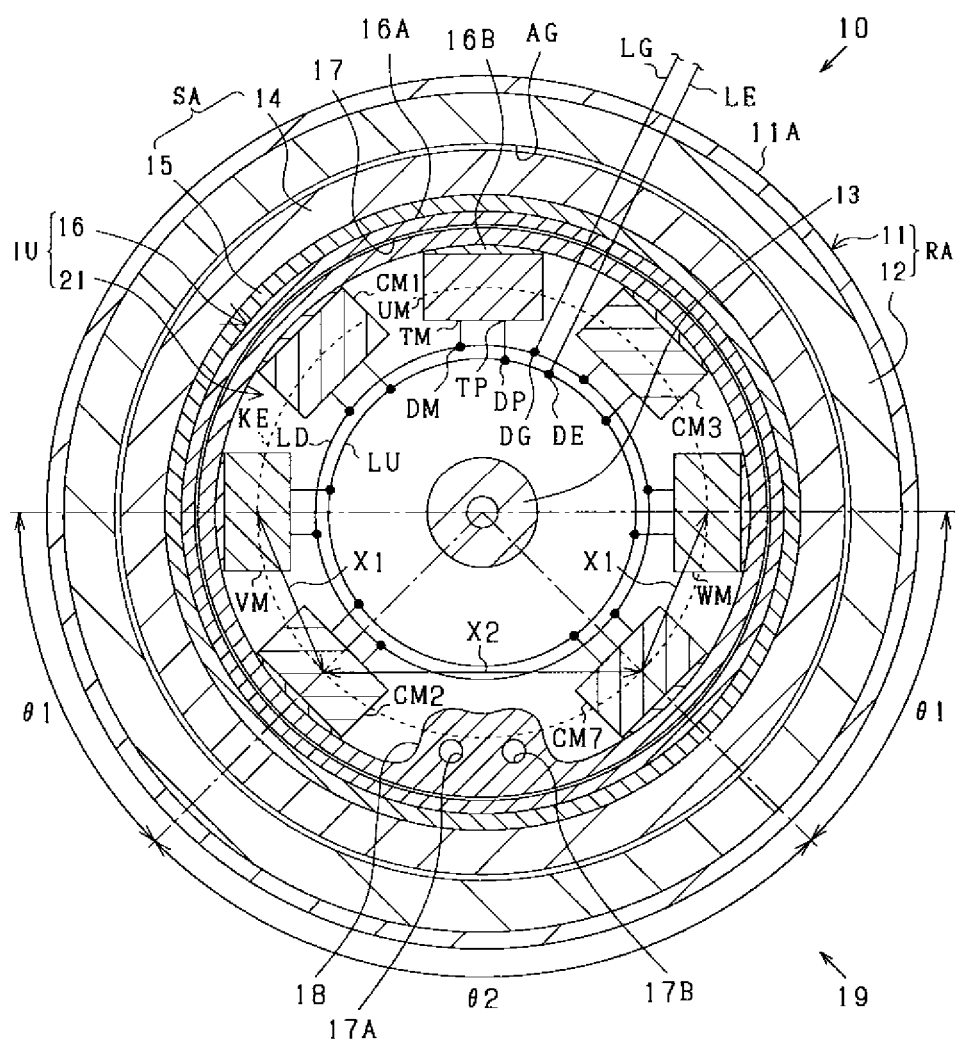
FIG. 7 is a diagram showing a lateral cross-sectional view of a rotary electric machine according to a third embodiment.

Hereinafter, with reference to FIG. 7, a third embodiment will be described. In the third embodiment, configurations different from those in the first embodiment will be mainly described. In FIG. 7, configurations same as those in FIG. 2 will be applied with the same reference numbers as those in FIG. 2 and the explanation thereof will be omitted for the sake of convenience.

According to the third embodiment, the configuration differs from the first embodiment in that a protrusion 18 is formed in a portion radially inside a coolant passage 17 in the cylindrical portion 16A of the inverter housing 16. In the protrusion 18, an input passage 17A and an output passage 17B of the coolant passage 18 are provided, and the cooling water can flow through the coolant passage 17 via the input passage 17A and the output passage 17B.

According to the present embodiment, a part of the protrusion 18 is positioned on a virtual circle KE in which the respective modules are arranged. For this reason, in the inverter housing 16, an extended portion 19 is provided on the virtual circle KE, in which an interval between adjacent modules in the circumferential direction is extended compared to other portions. The protrusion 18 is provided in the extended portion 19. Specifically, as shown FIG. 7, the respective modules are arranged in the circumferential direction, having intervals between the respective modules in the circumferential direction, as a first interval X1 or a second interval X2. The second interval X2 is larger than the first interval X1. In this case, the interval between adjacent modules in the circumferential direction without the protrusion 18 is defined as the first interval X1, and the interval between adjacent modules in the circumferential direction interposed by the protrusion 18 is defined as the second interval X2. That is, the interval of the extended portion 19 is the second interval X2.

Note that the intervals between the modules in the circumferential direction may be defined as angle intervals θ1 and θ2 (θ1<θ2) of which the center is the rotary shaft 13 in the virtual circle KE.

The capacitor modules CMs are arranged at both sides of extended portion 19 therebetween. In order to accomplish this arrangement, four capacitor modules CM1 to CM3 and CM7 of which the number of modules is larger than that of the switching modules UM, VM and WM are provided in the inverter 21. As shown in FIG. 7, the respective modules and the protrusion 18 arranged in the circumferential direction in the order of the U-phase switching module UM, the first capacitor module CM1, the V-phase switching module VM, the second capacitor module CM2, the protrusion 18, the seventh capacitor module CM7, the W-phase switching module WM and the third capacitor module CM3.

According to the above-described embodiment, capacitor modules CMs are arranged at both sides of the extended portion 19, and the switching module #M is prevented from being arranged at one side of the extended portion 19 in the circumferential direction.

Assuming that the switching module #M (hereinafter referred to as specific switching module #M) is arranged at one side of the extended portion 19 in the circumferential direction 19, the capacitor modules CMs are arranged at both sides of the respective switching modules #M, whereby one capacitor module among the capacitor modules CMs arranged at both sides of the specific switching modules #M is arranged at the other side of the extended portion 19 in the circumferential direction.

In this case, for the inductance of the positive side conductor LU or the negative side conductor LD in a path from the specific switching module #M to the capacitor module CM in the both sides thereof, an impedance of a capacitor module CM in the other side, that is, the capacitor module CM arranged in the opposite side of the extended portion 19 is smaller than that of the other side. Hence, the current IM concentratedly flows to the other capacitor module CM from the specific switching module #M, thus causing a deviation in the amount of generated heat of the capacitor modules CMs.

According to the present embodiment, capacitor modules CMs are arranged at both sides of the extended portion 19. Hence, presence of the extended portion 19 prevents the generated heat of the capacitor modules CMs from being deviated.

Fourth Embodiment

Figure 8:
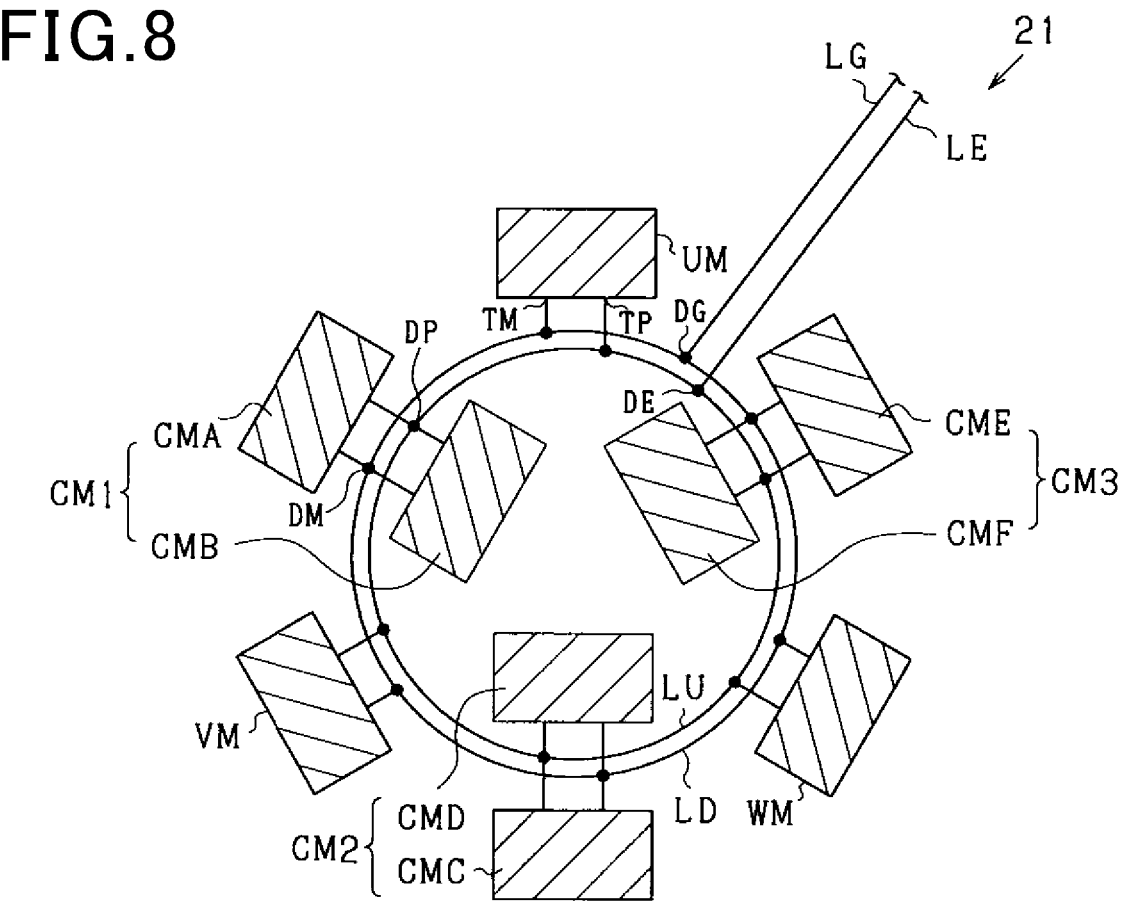
FIG. 8 is a diagram showing an overall configuration of an inverter according to a fourth embodiment.

Hereinafter, with reference to FIG. 8, a fourth embodiment will be described. In the fourth embodiment, configurations different from those in the first embodiment will be mainly described. In FIG. 8, configurations same as those in FIG. 2 will be applied with the same reference numbers as those in FIG. 2 and the explanation thereof will be omitted for the sake of convenience.

According to the present embodiment, the configuration differs from the first embodiment in that six capacitor modules CMA to CMF are provided to have the number of modules being twice as much as the number of switching modules UM, VM and WM. As shown in FIG. 8, according to an inverter 21 of the present embodiment, two capacitor modules CMs are arranged between switching modules #M positioned adjacently in the circumferential direction. These two capacitor modules are arranged the cylindrical portion 16A in the radial direction or the axial direction thereof.

According to the present embodiment, the two capacitor modules CMs arranged between adjacent switching modules #M are connected to the positive and negative side conductors LU and LD at the same connection points DP and DM. Specifically, the capacitor modules CMA and CMB are arranged between a U-phase switching module UM and a V-phase switching module VM positioned adjacently in the circumferential direction, and connected to the positive and negative side conductor LU and LD at the same connection points DP and DM.

Accordingly, each capacitor 26 included in the capacitor modules CMA and CMB has the same inductance in a path from the U-phase switching module UM and the V-phase switching module VM. Further, capacitors 26 included in the capacitor modules CMA and CMB form a synthetic capacitance in which capacitance of the respective capacitors 26 are summed. According to the present embodiment, the capacitor modules CMA and CMB form a first capacitor module CM1. In other words, the synthetic capacitance of the capacitors 26 corresponds to the capacitance of the capacitors 26 included in the first capacitor module CM1.

Similarly, a capacitor modules CMC and a capacitor module CMD are arranged between the V-phase switching module VM and the W-phase switching module WM, in which the capacitor modules CMC and CMD form a second capacity module CM2. Also, a capacitor module CME and a capacitor module CMF are arranged between the W-phase switching module WM and the U-phase switching module UM, in which the capacitor modules CME and the CMF form a third capacitor module CM3.

According to the above-described embodiment, even when two capacitor modules are arranged between switching modules #M positioned adjacently in the circumferential direction, the same connection points DP and DM are used for the two capacitor modules CMs, whereby inductances between capacitors included in these capacitor modules are the same. Hence, the current IM can flow uniformly through these capacitor modules CMs so that a deviation in the heat generated in the capacitor modules CMs can be suppressed.

According to the present embodiment, the capacitances of the capacitors 26 included in the first to third capacitor modules CM1 to CM3 are each formed by a synthetic capacitance of two capacitor 26. Hence, compared to a case where a single capacitor 26 forms a capacitance, a capacitance of the capacitor 26 included in the first to third capacitor modules CM1 to CM3 can be appropriately adjusted.

Other Embodiments

The present disclosure is not limited to the configurations in the above-described embodiments, and may be embodied in the following manner.

As a rotary electric machine 10, it is not limited to a rotary electric machine having three-phase windings, but may be configured to have two phase or four phase windings. In this case, the number of switching modules #M can be set depending on the number of phases of the rotary electric machine 10, and the number of capacitor modules CMs can be set depending on the number of switching modules #M.

As the rotary electric machine 10, it is not limited to an outer rotor type, but may be configured as an inner rotor type. Further, a connection method of the winding 14 in the rotary electric machine is not limited to a star-connection, but an open-delta connection may be utilized.

Figure 9A:
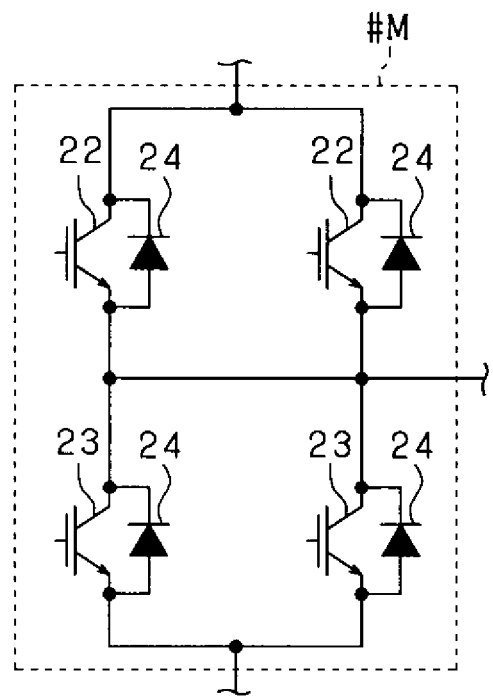
FIGS. 9A and 9B are diagram each showing a circuit diagram of a switching module.
Figure 9B:
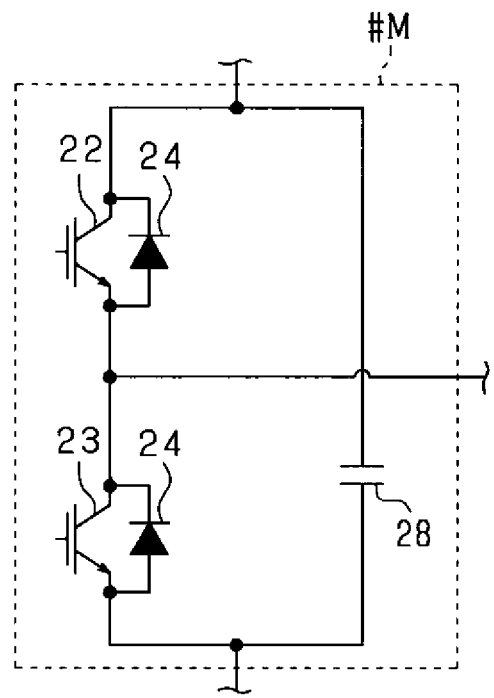

As the switching module #M, it is not limited to one having a single series-connected circuit. However, as shown in FIG. 9A, the switching module #M may be configured to have a plurality of series-connected circuits. Moreover, as shown in FIG. 9B, a snubber capacitor 28 may be connected in parallel to the series-connected circuit in order to suppress surge voltage. Note that since the capacitance of the snubber capacitor 29 is smaller than that of the capacitor 26 included in the capacitor module CM, the snubber capacitor 28 cannot suppresses high frequency oscillation occurring in the current IM due to switching operation.

In the case where the snubber capacitor 29 is connected in parallel to the series-connected circuit, the switching modules #M and the capacitor modules CMs may preferably be alternately arranged in the circumferential direction. Thus, an amount of current flowing through the capacitors 26 included in the capacitor modules CMs can be appropriately equalized. Hence, a deviation in the generated heat in the capacitor modules CMs can be reliably suppressed.

According to the present embodiments, the positive side conductor LU and he negative side conductor LD are each formed in an annular shape, but may be formed in a polygonal-annular shape. In other words, any annular shapes can be used. Moreover, the positive side conductor LU and the negative side conductor LD are each formed in a closed annular shape, but may be formed such that a part of the closed-annular shape has a notch portion.

Members disposed in the extended portion 19 is not limited to the protrusion 18, but may be a wiring member for wiring the power line LE and the ground line LG, or the control apparatus 30.

According to the fourth embodiment, a configuration is exemplified in which two capacitor modules are each arranged between the switching modules #M positioned adjacently in the circumferential direction. However, the number of capacitor modules CMs arranged between these switching module #M may be three or more.

In this case, even in the case where the number of the capacitor modules CMs is three or more, since these capacitor modules CMs are connected to the same connection points DP and DM on the positive side conductor LU and the negative side conductor LD, the inductances between the capacitors included in the capacitor module CM are not changed. Hence, the current IM can flow uniformly through the capacitor modules CMs, thus suppressing a deviation in an amount of heat generated in the capacitor modules CMs.

CONCLUSION

Embodiments of the present disclosure have been described so far. According to the present disclosure, it is provided a power conversion apparatus capable of suppressing a deviation in heat generated in capacitor modules.

As a first aspect, the present disclosure provides a power conversion apparatus provided in a rotary electric machine, converting a power between a DC power source and the rotary electric machine having a multiphase winding. The power conversion apparatus includes: a plurality of switching modules each having a switching element for performing switching to control a current direction of a current flowing from the DC power source to the winding; a plurality of capacitor modules each having a capacitor that suppresses high frequency oscillation occurring on the current due to the switching operation; a positive side conductor connected to a positive electrode of the DC power source; and a negative side conductor connected to a negative electrode of the DC power source.

The plurality of switching modules and the plurality of capacity modules are connected in parallel between the positive side conductor and the negative side conductor. The plurality of switching modules and the plurality of capacity modules are arranged annularly. The positive side conductor and the negative side conductor are formed annularly, and connected to terminals (TP, TM) of respective switching modules and respective capacitor modules in an arrangement order of the switching modules and the capacitor modules in a circumferential direction. The capacitor modules are disposed at both sides of each switching module, and capacitances of capacitors included in the capacitor modules disposed at the both sides are the same value.

According to a power conversion apparatus that converts the DC power to multi-phase AC power, a plurality of switching modules and a plurality of capacitor modules are provided, and they are connected in parallel between the positive side conductor and the negative side conductor. These switching modules and the capacitor modules are arranged annularly, and thus the positive side conductor and the negative side conductor are arranged annularly. Then, an amount of heat generated may deviate between the capacitor modules depending on the arrangement order of the respective modules in the circumferential direction. In this respect, according to the above-described configuration, the capacitor modules are disposed at both sides of the respective switching modules, and the capacitances of the capacitors included in the capacitor modules disposed at both sides are set to be the same. According to this configuration, since substantially the same amount of current flows from the respective switching modules into the capacitors having the same capacitance at both sides, an amount of heat in the respective capacitor modules can be equalized. As a result, a deviation of an amount of heat generated in the capacitor modules can be avoided.

According to a second aspect, the plurality of switching modules and the capacitor modules are arranged such that each switching module and each capacitor module are arranged alternately in the circumferential direction.

According to this configuration, the number of capacitor modules required for the power conversion apparatus can be reduced while the current flowing to each capacitor included in the respective capacitor modules is equalized. Hence, the configuration of the power conversion apparatus can be simplified.

As a third aspect, two capacitor modules connected to the positive side conductor and the negative side conductor at mutually different connection points, are arranged between adjacent switching modules in the plurality of switching modules and the plurality of capacitor modules arranged in the circumferential direction.

According to this configuration, no switching modules are arranged at both sides of respective capacitor modules. Hence, it is avoided that the current flows to the capacitors included in the respective capacitor modules from the switching modules at the both sides, whereby the current is prevented from excessively flowing into the capacitors.

As a fourth aspect, two or more capacitor modules are disposed between adjacent switching modules in the plurality of switching modules and the plurality of capacitor modules arranged in the circumferential direction, the two or more capacity modules are connected to the positive side conductor and the negative side conductor at the same connection points.

According to the above-described configuration, connection points are set to be the same, whereby the current can flow through these capacitor modules uniformly even when two or more capacitor modules are disposed between adjacent switching modules arranged in the circumferential direction. Hence, a deviation in heat generated in the capacitor modules can be suppressed.

As a fifth aspect, connection points in the positive side conductor and the negative side conductor, connected to the terminals of the respective switching modules and the respective capacitor modules, are arranged at equal intervals in the circumferential direction.

According to this configuration, total impedance from the respective switching modules to each capacitor included in each capacitor module located at both sides of respective switching modules can be the same. Thus, a deviation in the heat generation of in the capacitor modules can be suppressed.

As a sixth aspect, an extended portion in which an interval between adjacent modules in the circumferential direction is extended compared to other portion, is provided on a virtual circle on which the plurality of switching modules and the capacitor modules are arranged, and the capacitor modules are disposed at both sides of the extended portion.

According to a rotary electric machine, a circulation passage may be formed to circulate the circulation water for cooling the rotary electric machine. In the case where a power conversion apparatus is provided in this rotary electric machine and a plurality of switching modules and a plurality of capacitor modules which constitute the rotary electric machine are disposed annularly, a part of the circulation passage may be overlapped on a virtual circle where these modules are arranged. Hence, an extended portion in which an interval between adjacent modules is extended compared to that of other portions may be formed. In this case, when a switching module is provided in one side of the extended portion with respect to the circumferential direction, and one capacitor module between capacitor modules disposed at both sides of the switching module is provided in the other side of the extended portion with respect to the circumferential direction, the current concentratedly flows from the switching module to other capacitor module, that is, the capacitor module disposed in an opposite side of the extended portion, and causes a deviation in heat generated in the capacitor modules. According to the above-described configuration, the capacitor modules are disposed at both sides of the extended portion. Accordingly, presence of the extended portion prevents the generated heat of the capacitor modules from being deviated.

As a seventh aspect, the rotary electric machine is provided including: a rotor provided rotatably integrated with a rotary shaft; a stator having a cylindrical shape, disposed at position facing the rotor in a radial direction and provided with a multiphase winding; and a housing having a cylindrical portion fixed to the stator in a radially inside or a radially outside thereof. The rotary electric machine is assembled with the rotary electric machine. The plurality of switching modules and the plurality of capacitor modules are arranged in the circumferential direction along the cylindrical portion in the housing.

According to a rotary electric machine in which the rotor and the stator are arranged facing each other in the radial direction, and the cylindrical portion of the housing is fixed to a portion of a radially inner side or outer side of the stator, annular space is formed along the cylindrical shape and the switching modules and the capacitor modules are arranged in the annular space. In this case, respective modules are arranged in a radially inside or outside portion of the rotor and the stator in the rotary electric machine. Hence, the power conversion apparatus can be arranged efficiently in the rotary electric machine. Further, in a configuration in which the stator and the housing are integrated and the power conversion apparatus is attached to the housing, the power conversion apparatus may be influenced by heat generated by the stator. According to the above-described configuration, the respective capacitor modules are efficiently arranged, whereby suitable heat countermeasures can be accomplished.

What is claimed is:

1. A power conversion apparatus provided in a rotary electric machine to convert power between a DC power source and the rotary electric machine having a multiphase winding, the power conversion apparatus comprising:
    a plurality of switching modules each having a switching element for performing switching to control a current direction of a current flowing from the DC power source to the winding;
    a plurality of capacitor modules each having a capacitor that suppresses high frequency oscillation occurring on the current due to the switching;
    a positive side conductor connected to a positive electrode of the DC power source; and
    a negative side conductor connected to a negative electrode of the DC power source, wherein:
    the plurality of switching modules and the plurality of capacitor modules are connected in parallel between the positive side conductor and the negative side conductor;
    the plurality of switching modules and the plurality of capacitor modules are arranged annularly;
    the positive side conductor and the negative side conductor are formed annularly and are connected to terminals of respective switching modules and respective capacitor modules in an arrangement order of the switching modules and the capacitor modules in a circumferential direction;
    ones of the capacitor modules are disposed at both sides of each switching module, and capacitances of capacitors included in the capacitor modules disposed at the both sides are the same value; and an extended portion, in which an interval between adjacent ones of the modules in the circumferential direction is extended compared to another portion, is provided on a virtual circle on which the plurality of switching modules and the plurality of capacitor modules are arranged, and ones of the capacitor modules are disposed at both sides of the extended portion.

2. The power conversion apparatus according to claim 1, wherein
the plurality of switching modules and the plurality of capacitor modules are arranged such that each switching module and each capacitor module are arranged alternately in the circumferential direction.

3. The power conversion apparatus according to claim 1, wherein
two of the capacitor modules connected to the positive side conductor and the negative side conductor at mutually different connection points are arranged between adjacent switching modules in the plurality of switching modules and the plurality of capacitor modules arranged in the circumferential direction.

4. The power conversion apparatus according to claim 1, wherein
two or more of the capacitor modules are disposed between adjacent switching modules in the plurality of switching modules and the plurality of capacitor modules arranged in the circumferential direction, and the two or more capacitor modules are connected to the positive side conductor and the negative side conductor at the same connection points.

5. The power conversion apparatus according to claim 1, wherein
connection points in the positive side conductor and the negative side conductor, which are connected to the terminals of the respective switching modules and the respective capacitor modules, are arranged at equal intervals in the circumferential direction.

6. The power conversion apparatus according to claim 1, wherein:
the rotary electric machine comprises:
a rotor provided rotatably integrated with a rotary shaft;
a stator (i) having a cylindrical shape, (ii) disposed at a position facing the rotor in a radial direction, and (iii) provided with a multiphase winding; and
a housing having a cylindrical portion fixed to the stator in a radially inside or a radially outside thereof,
the power conversion apparatus is assembled with the rotary electric machine; and
the plurality of switching modules and the plurality of capacitor modules are arranged in the circumferential direction along the cylindrical portion in the housing.

* * * * *